July 8, 1958

R. E. DAHLGREN 2,841,911

FISHING SINKER

Filed April 6, 1956

INVENTOR.
ROY E. DAHLGREN
BY
McMorrow, Berman & Davidson
ATTORNEYS

United States Patent Office 2,841,911
Patented July 8, 1958

2,841,911

FISHING SINKER

Roy E. Dahlgren, Seattle, Wash.

Application April 6, 1956, Serial No. 576,598

1 Claim. (Cl. 43—43.12)

This invention relates to fishing sinkers, and more particularly has reference to a sinker which may be either the so-called "plunking" type, or a drift or trolling sinker.

It is well known that the attachment of a sinker to a fishing line, and also the detachment of the sinker from the line, is often accompanied by a considerable difficulty and loss of time. Many times, one may desire to change a sinker, to put on the line a sinker of a different weight, according to various depths, currents, etc.

Further, even though considerable inconvenience usually attends the attachment or removal of sinkers, the sinkers are still lost by becoming detached from the line during use. Alternatively, if the sinker is attached to the line with a particularly strong connection to insure against loss, this in itself often causes difficulties in that the sinker may snag upon an underwater obstruction, under which circumstances it is desirable to permit detachment of the sinker to save the line and other fishing equipment such as lures, etc. When the sinker is attached with so strong a connection as to prevent its detachment under a predetermined amount of pull upon the line after snagging of the sinker on an underwater obstruction, the only alternative is to break the line and stand the loss of the hook or lure, as well as a substantial portion of the line.

The main object of the present invention is to eliminate the several inconveniences and difficulties which have heretofore existed, through the provision of a shank sinker, the shank of which is adapted to be engaged in one end of a length of resilient tubing, such as rubber surgical tubing, the other end of said length of tubing being adapted for connection to a line-attaching swivel or the like. Due to the particular relationship of the shank to the tubing, one is enabled to remove the sinker from the line and attach another of a different width with a minimum amount of effort, since it is merely necessary that the end of the rubber tubing be rolled back over the shank. At the same time, however, when the shank is fully inserted in and is effectively gripped by the tubing, relative separation of the tubing and shank become very difficult, so that accidental loss of the sinker does not result. Nevertheless, should the sinker snag upon an underwater obstruction, on the exertion of a predetermined amount of pull upon the line the sinker will detach from the tubing and thus there will be no loss of valuable fishing equipment.

A further object of importance is to provide a connection between a sinker and an associated fishing line that will be so designed as to permit manufacture of the same at a relatively low cost, despite the clear advantages which the construction has over other devices previously conceived for the same general purpose.

Yet another object is to provide a connection between the sinker and the line-attaching swivel which will, despite its relatively low cost and its particularly effective gripping of the shank of the sinker, be fully flexible for the greatest part of its length, so that the sinker is free to gravitate to a proper position without affecting adversely the position of the line and the associated hook or lure.

Another object of importance is to provide a device of the nature described that will be especially adapted to permit connection to be made to conventional swivels and other line-attaching means, thus to incorporate to a desirable extent manufactured components already in use, thereby to reduce to the maximum the cost of the construction of the device.

Other objects will appear from the following description, the claim appended thereto, and from the annexed drawing in which like reference characters designate like parts throughout the several views and wherein:

Figure 1:
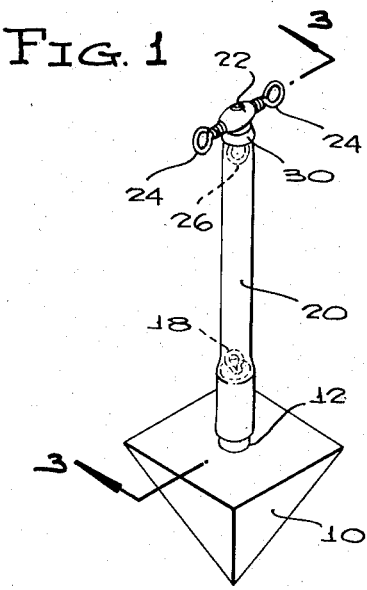
Figure 1 is a perspective view of a "plunking sinker" formed according to the present invention.
Figure 3:
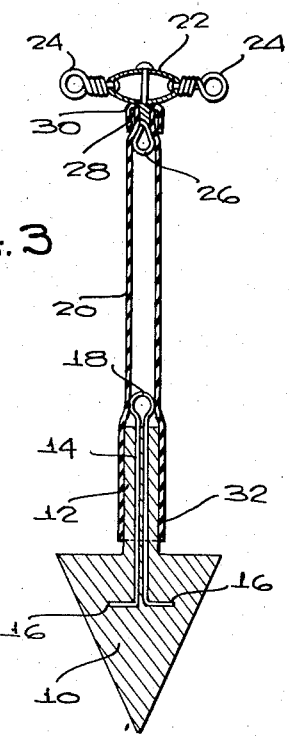
Figure 3 is a longitudinal sectional view on line 3—3 of Figure 1, on an enlarged scale.
Figure 2:
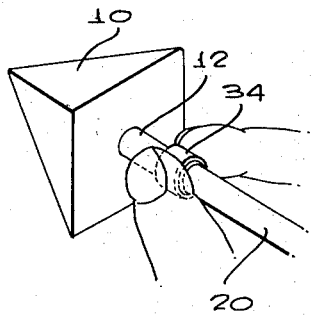
Figure 2 is a fragmentary perspective view showing the manner of attaching or detaching the sinker.

Referring to the drawings in detail, in Figures 1–3 there is shown a sinker including a weight 10 of pyramidal shape, the apex of which points downwardly so as to provide a "plunking" sinker, used for bottom fishing or the like.

Cast integrally with the base of the weight, and extending axially of the weight upwardly from the base, is an elongated, cylindrically shaped shank 12. Embedded in the shank and in the body of the weight is a U-shaped connector element 14 of wire or the like, the legs of which are extended in closely spaced, parallel relation within the shank and terminate at their inner ends in oppositely, laterally directed extensions 16 to insure the firm anchoring of the connector in the weight. The bight portion of the connector element 14 projects above the outer end of the shank, and is of generally circular shape to provide a line-attaching eye 18.

The purpose of the connecting element is to permit the sinker to be connected to a fishing line directly, if it is so desired by the user. However, when the sinker is connected to the line by means of a length of tubing 20 in accordance with the present invention, the connector element 14 is inoperative and discharges no function, being unnecessary in effecting a proper connection of the weight to the line.

The elongated length of tubing 20 is of a length approximately three times that of the shank 12, although this ratio can be varied to some degree. It is important that a substantial part of the length of the tubing be disposed beyond the outer end of the shank, so as to be free to flex in any direction during use of the weight.

The tubing 20 is formed of a resilient material, such as rubber, and it has been found in practice that a length of rubber surgical tubing well serves the purposes of the invention. When the tubing is in its normally contracted condition, the inner diameter thereof is substantially less than the diameter of the shank 12.

At the end of the tubing opposite that receiving the shank 12, there is provided a line-attaching means. In the illustrated form of the invention, but not necessarily, this is a three-way swivel 22 having oppositely projecting line-attaching eyes 24 aligned in a line normal to the length of the tubing and to the length of an intermediate eye 26. Eye 26 has a coiled shank, and the adjacent end of the tubing receives the shank and the loop portion of eye 26, said end of the tubing being folded upon itself to provide a cuff 28 within which extends a clamping wire 30. In this way, the tubing is clamped about the shank of the eye 26, to provide a secure connection therebetween. It may be noted that the eye 26 is swively attached to the body of the swivel, and hence the tubing 20 is also swively attached to said body, permitting free rotational movement of the weight upon the line.

The end of the tube 20 that receives the shank 12 has been designated at 32, and is distended to increase the diameter thereof when the shank 12 is engaged therein.

The manner of attaching the weight to the tubing will now be noted, and constitutes an important feature of the invention. Referring to Figure 2, the end portion 32 is rolled back upon itself, and the shank 12 engaged at its outer end therein. Then, the rolled portion 34 of Figure 2 is rolled back onto the shank 12, so that when the shank is fully engaged in the tube, the end portion 32 will be fully unrolled, and will extend substantially the full length of shank 12. Due to the nature of the material of the tube 20, end portion 32 is resiliently distended and firmly grips the shank 12.

It has been found in practice that the idea of connecting the shank to the line-attaching means through the medium of a resilient length of tubing, capable of being rolled back in the manner described, permits the fisherman to remove a sinker from the line and attach another one of a different weight with very little effort. By rolling back the tubing, the first shank can be removed, and the shank of the new weight inserted, after which the tube is rolled onto the new shank. It has been found that thereafter, it is very difficult for loss of the weight to occur.

Should it happen that the weight is snagged upon an underwater obstruction, however, sufficient pull upon the line will finally cause the tubing to be pulled off the shank, thereby avoiding the loss of the fishing equipment. In other words, the easily and swiftly made connection is one which ordinarily is of exceptionally great strength, to prevent accidental separation of the weight from the tubing, but said strength is not so great as to prevent the shank from moving out of the tubing if the situation requires that this be done as for example, when the weight is snagged.

Figure 4:
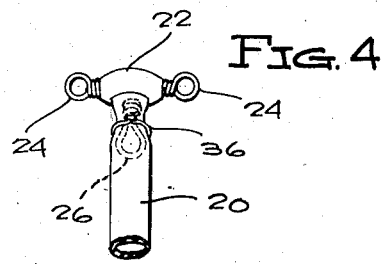
Figure 4 is a fragmentary perspective view showing a modified connection to the line-attaching swivel.

Referring to Figure 4, there is here shown a modified connection of the tube to the swivel 22. In this form, instead of a cuff 28, the tube is simply positioned over the eye 26, and a wire 36 is extended thereabout and twisted to contract the tube to the shank of said eye 26.

Figure 5:
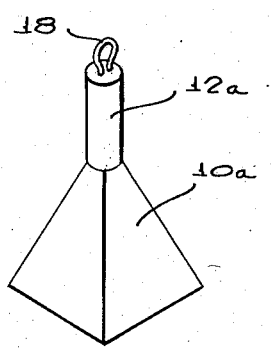
Figure 5 is a perspective view of a modified weight.

In Figure 5 there is shown a modified weight 10a of pyramidal shape, the shank 12a of which extends from the apex of the weight, rather than from the base. The connector 18 is embedded in the shank and the body of the weight as in the first form of the invention. This type of sinker is used for drifting or trolling, but is connected to the swivel through the medium of the tubing 20 in the same manner as in the first form.

Important characteristics of the invention reside in the ease with which a weight can be detached or reattached by the rolling back of the tube, and in the nature of the connection between the weight and tube, which is such as to ordinarily make very difficult the extraction of the shank from the tube without said rolling back of the tube, while at the same time permitting withdrawal of the shank when the shank is snagged, to prevent the loss of the fishing equipment.

Further, the tubing provides an inexpensive connection, permits the use of conventional line-attaching components such as the swivel 22, and provides a flexible connection between the shank and said line-attaching swivel.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

A fishing sinker comprising: a symmetrically shaped, weighted body; a shank fixedly connected at one end to and projecting from one end of the body, said shank, for its full length, being of imperforate, smooth-surfaced formation, of circular cross-section, and of constant diameter; a highly resilient, thin-walled, flexible tube substantially longer than the shank and normally contracting to an inner diameter less than that of the shank, one end of the tube being radially distended to fit onto and grip said shank for the greatest part of the length of the shank, said end of the tube being adapted to separate from the shank responsive to a strong axial pull exerted on the shank and tube in a direction tending to pull the same apart and exceeding a predetermined value, the resiliency of the tube constituting the sole force holding the same on the shank; and a line connector including a portion engaged in the other end of the tube, said portion of the line connector having an enlarged free end, the other end of the tube including a cuff radially contracted about the line connector in back of said enlarged free end, the engagement of the cuff with said line connector portion being of a strength exceeding in value the grip of said one end of the tube on the shank.

References Cited in the file of this patent

UNITED STATES PATENTS

| 2,085,320 | Kolstrand | June 29, 1937 |
| 2,117,322 | Hillman | May 17, 1938 |
| 2,461,833 | Mercier | Feb. 15, 1949 |
| 2,727,332 | Benson | Dec. 20, 1955 |

FOREIGN PATENTS

| 83,063 | Norway | Feb. 1, 1954 |